United States Patent
Tu et al.

(10) Patent No.: US 9,787,121 B2
(45) Date of Patent: Oct. 10, 2017

(54) POWER SUPPLY CONTROL METHOD AND PORTABLE ELECTRONIC DEVICE USING THE SAME

(71) Applicant: ASUSTeK COMPUTER INC., Taipei (TW)

(72) Inventors: Wei-Chen Tu, Taipei (TW); Ming-Ting Tsai, Taipei (TW); Yi-Ming Huang, Taipei (TW); Hsiang-Jui Hung, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 158 days.

(21) Appl. No.: 14/791,256

(22) Filed: Jul. 3, 2015

(65) Prior Publication Data
US 2016/0181831 A1   Jun. 23, 2016

(30) Foreign Application Priority Data
Dec. 22, 2014   (TW) .............................. 103144757 A (51) Int. Cl.
| | | |
|---|---|---|
| H02B 1/24 | (2006.01) | |
| H02J 7/00 | (2006.01) | |
| G06F 1/26 | (2006.01) | |
| H02J 1/06 | (2006.01) | |
| H02J 7/34 | (2006.01) | |

(52) U.S. Cl.
CPC ............... *H02J 7/007* (2013.01); *G06F 1/26* (2013.01); *H02J 1/06* (2013.01); *H02J 7/0021* (2013.01); *H02J 7/0052* (2013.01); *H02J 7/34* (2013.01); *H02J 2007/0062* (2013.01)

(58) Field of Classification Search
CPC .. H02J 7/007; H02J 1/06; H02J 7/0025; H02J 7/34; H02J 2007/0062; G06F 1/26
See application file for complete search history.

(56) References Cited

U.S. PATENT DOCUMENTS

2016/0172874 A1* 6/2016 Hsu ......................... G06F 1/28
                                                                320/107

FOREIGN PATENT DOCUMENTS

| CN | 101202465 | 6/2008 |
|---|---|---|
| TW | 201303313 | 1/2013 |

* cited by examiner

*Primary Examiner* — Daniel Cavallari
(74) *Attorney, Agent, or Firm* — Jianq Chyun IP Office (57) ABSTRACT

A power supply control method and a portable electronic device using the same are provided. The power supply control method includes following steps: detecting an input voltage and an input current at a power input terminal of the portable electronic device; setting a plurality of detection loads sequentially to control a power adaptor to provide a detection current as the input current for the portable electronic device respectively; calculating an equivalent input impedance of the power input terminal according to the detection current and the corresponding input voltage; calculating an actual output voltage of the power adaptor according to the equivalent input impedance, the input voltage, and the input current; and setting a work load according to the actual output voltage to control the power adaptor to provide a work current as the input current for the portable electronic device.

10 Claims, 6 Drawing Sheets

FIG. 7

POWER SUPPLY CONTROL METHOD AND PORTABLE ELECTRONIC DEVICE USING THE SAME

CROSS-REFERENCE TO RELATED APPLICATION

This application claims the priority benefit of Taiwan application serial No. 103144757, filed on Dec. 22, 2014. The entirety of the above-mentioned patent application is hereby incorporated by reference herein and made a part of specification.

BACKGROUND OF THE INVENTION

Field of the Invention

The invention relates to a power supply control method and, more particularly, to a power supply control method and a portable electronic device using the same.

Description of the Related Art

As the development of science technology, various portable electronic devices, such as a tablet computer, a personal digital assistant (PDA), a laptop computer and a smart phone, become necessary in daily life.

Conventionally, the portable electronic device is charged or discharged via a power adaptor which conforms to a universal serial bus (USB) power delivery (PD) standard. The power adaptor is connected to a USB interface of the portable electronic device via power lines to charge the portable electronic device.

Conventionally, different power adaptors have different rated output power or maximum output power, and different portable electronic devices have different load settings. In an embodiment, the rated output power of the power adaptor is 5V/1 A. When the load of the portable electronic device is set to extract the current of 1 A, the power adaptor generates the output current of 1 A when the portable electronic device is connected to the power adaptor. When the load of the portable electronic device is set to extract the current of 0.5 A, the power adaptor generates the output current of 0.5 A when the portable electronic device is connected to the power adaptor.

As stated above, a portable electronic device extracts the current from the power adaptor according to a constant load setting, therefore, when the specification of the portable electronic device is matched with the rated output power of the power adaptor, the power adaptor achieves its highest power supply efficiency.

However, when the rated output power of the power adaptor is not matched with the load specification of the portable electronic device, the power adaptor supplies power inefficiently. Moreover, when the load of the portable electronic device is too heavy, the power adaptor overloads, which brings risks in usage.

BRIEF SUMMARY OF THE INVENTION

A power supply control method of a portable electronic device and a portable electronic device using the same are provided. Via the power supply control method and the portable electronic device, the output capacity of the power adaptor is detected and the corresponding work load is set accordingly to extract current from the power adaptor.

The power supply control method of the portable electronic device is adapted to control the current extracted from the power adaptor by the portable electronic device. The power supply control method includes following steps: detecting an input voltage and an input current at a power input terminal of the portable electronic device; setting a plurality of detection loads sequentially to control the power adaptor to provide a detection current as the input current to the portable electronic device according to the detection loads, respectively; calculating an equivalent input impedance of the power input terminal according to the detection current and the corresponding input voltage, respectively; calculating an actual output voltage of the power adaptor according to the equivalent input impedance, the input voltage and the input current; and setting a work load according to the actual output voltage to control the power adaptor to provide a work current as the input current to the portable electronic device according to the work load.

The portable electronic device includes a power input terminal, a function module, a battery module and a charge control chip. The charge control chip is coupled to the function module and the battery module. When a power adaptor is connected to the power input terminal, the charge control chip receives power from the power adaptor via the power input terminal, and the charge control chip provides the power to the function module and the battery module. The charge control chip detects an input voltage and an input current at the power input terminal, and sets a plurality of detection loads sequentially to control the power adaptor to provide a detection current as the input current according to the detection loads, respectively. The charge control chip calculates an equivalent input impedance of the power input terminal according to the detection current and the corresponding input voltage, respectively. The charge control chip calculates an actual output voltage of the power adaptor according to the equivalent input impedance, the input voltage and the input current, and sets a work load according to the actual output voltage to control the power adaptor to provide a work current as the input current according to the work load.

These and other features, aspects and advantages of the present invention will become better understood with regard to the following description, appended claims, and accompanying drawings.

DETAILED DESCRIPTION OF THE EMBODIMENTS

The invention is illustrated with embodiments in the following. In the figures and embodiments, the same symbols denote the same or similar components, elements or steps.

Figure 1:
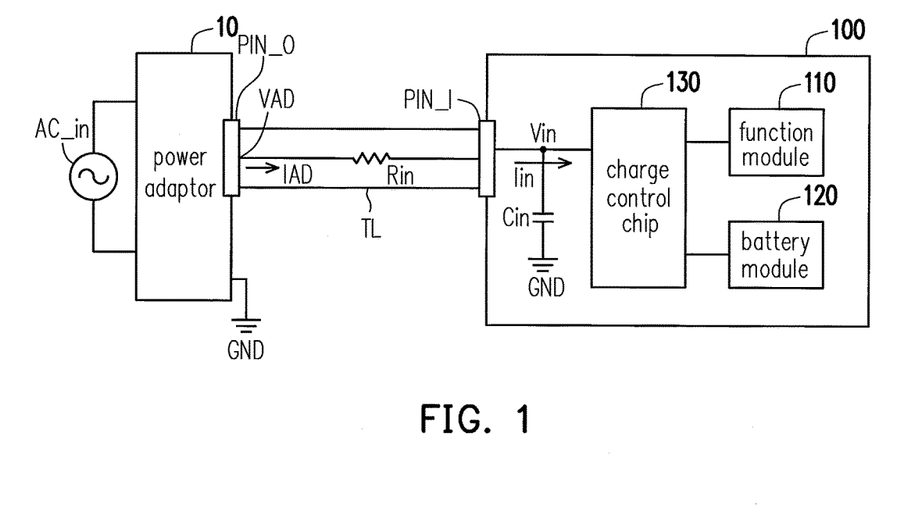
FIG. 1 is a schematic diagram showing a portable electronic device in an embodiment.

FIG. 1 is a schematic diagram showing a portable electronic device in an embodiment. Please refer to FIG. 1, the portable electronic device 100 extracts the work current from the power adaptor 10. The portable electronic device 100 is a notebook computer, a tablet computer, a smart phone, a personal digital assistant (PDA) or a game machine, which is not limited herein.

In the embodiment, the power adaptor 10 receives an external alternating current (AC) power supply AC_in, such as an electric supply. The power adaptor 10 converts the received AC power supply AC_in to direct current (DC) power supply (which includes output voltage $V_{AD}$ and output current $I_{AD}$) and provides the DC power supply to the portable electronic device 100. The output current $I_{AD}$ of the power adaptor 10 is determined according to the load setting of the portable electronic device 100. In other words, the portable electronic device 100 receives the AC power supply AC_in via the power adaptor 10, and the output voltage $V_{AD}$ and the output current $I_{AD}$ are provided to the portable electronic device 100 for operation and charging.

In detail, the portable electronic device 100 includes a power input terminal PIN_I, a capacitor $C_{in}$, a function module 110, a battery module 120 and a charge control chip 130. The portable electronic device 100 is connected to a power output terminal PIN_O of the power adaptor 10 via the power input terminal PIN_I and power lines TL, so as to receive the DC power supply from the power adaptor 10. The capacitor $C_{in}$ is coupled between the power input terminal PIN_I and the ground terminal GND for voltage stabilization.

The function module 110 is a hardware part of the portable electronic device 100 to provide specific functions. In an embodiment, the function module 110 is a central processing unit (CPU), a chipset, a memory, or a hard disk, which is not limited herein. The battery module 120 is a main power supply for the portable electronic device 100 when the portable electronic device 100 is not connected to the external AC power supply AC_in via the power adaptor 10. When the portable electronic device 100 is connected to the external AC power supply AC_in, the battery module 120 is charged under the control of the charge control chip 130.

The charge control chip 130 is coupled to the function module 110 and the battery module 120. The charge control chip 130 receives power from the power adaptor 10 when the power adaptor 10 is connected to the power input terminal PIN_I and provides the power to the function module 110 and the battery module 120. In detail, the charge control chip 130 detects a maximum output capacity of the power adaptor 10 and sets a work load according to the output capacity of the power adaptor 10. Thus, the portable electronic device 100 extracts current of different values according to the specifications of the different power adaptors 10. The extracted current maintains below an overcurrent protection value, and the extracted current is further reduced by a current level.

Figure 2:
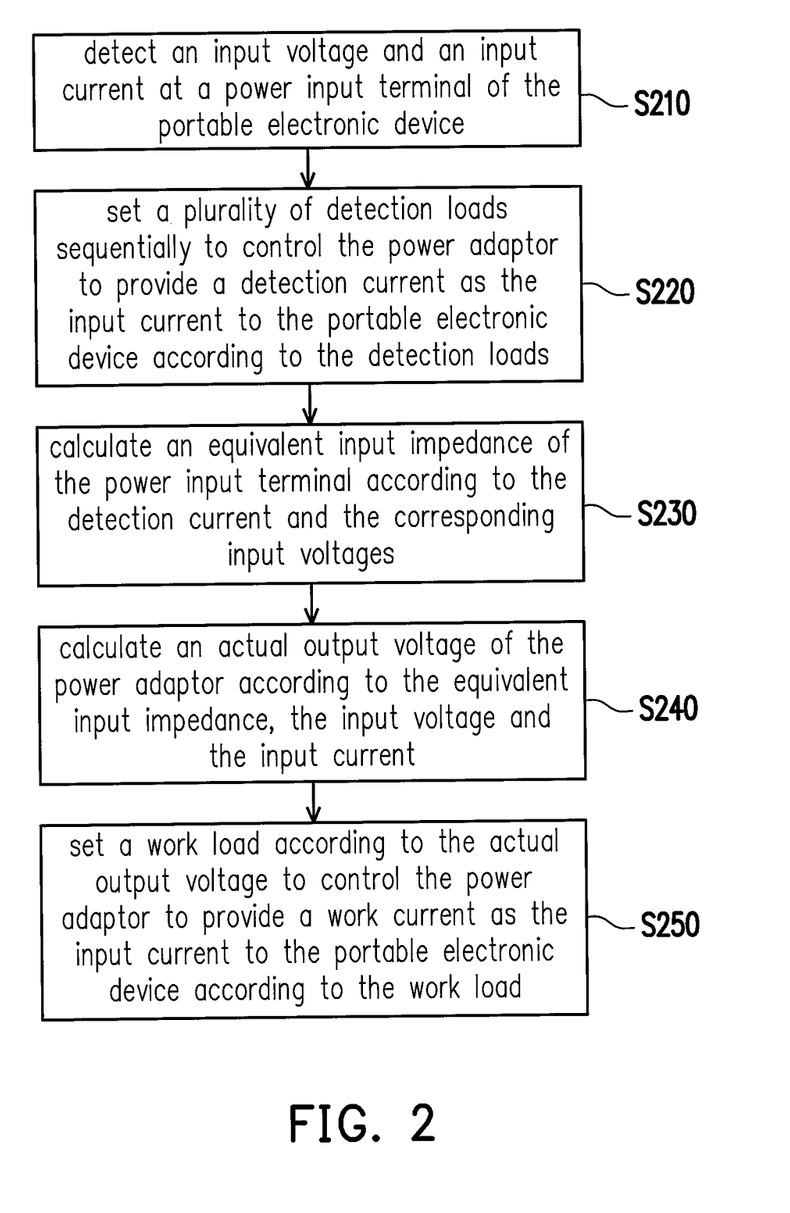
FIG. 2 is a flow chart showing a power supply control method of a portable electronic device in an embodiment.

In detail, the charge control chip 130 executes the steps shown in FIG. 2. FIG. 2 is a flow chart showing a power supply control method of the portable electronic device in an embodiment.

Please refer to FIG. 1 and FIG. 2, the charge control chip 130 detects the input voltage $V_{in}$ and the input current $I_{in}$ at the power input terminal PIN_I (step S210). When the charge control chip 130 determines that the power adaptor 10 is connected to the portable electronic device 100 via the power input terminal PIN_I, the charge control chip 130 sets a plurality of detection loads sequentially to control the power adaptor 10 to provide the corresponding output current $I_{AD}$ (the output current $I_{AD}$ at the moment is defined as the detection current) as the input current $I_{in}$ to the portable electronic device 100 according to the detection loads (step S220). Then, the charge control chip 130 calculates an equivalent input impedance $R_{in}$ of the power input terminal PIN_I according to the detection current (the input current $I_{in}$) detected in the step S220 and the corresponding input voltage $V_{in}$ (step S230). After the equivalent input impedance $R_{in}$ is calculated, the charge control chip 130 calculates an actual output voltage $V_{AD}$ at the power output terminal PIN_O of the power adaptor 10 according to the equivalent input impedance $R_{in}$, the input voltage $V_{in}$ and the input current $I_{in}$ (step S240). The charge control chip 130 then sets a work load according to the actual output voltage $V_{AD}$ to control the power adaptor 10 to provide the corresponding output current $I_{AD}$ (the output current $I_{AD}$ at the moment is defined as the work current) as the input current $I_{in}$ to the portable electronic device 100 according to the work load (step S250).

As a result, No matter how much the rated output power of the power adaptor 10 is, the power adaptor 10 ensures the security of the operation, and it provides power to the portable electronic device 100 with a high efficiency by power close to the rated output power. In the embodiment, since the charge control chip 130 sets the work load base valued based on the actual output voltage $V_{AD}$ of the power adaptor 10, no matter how much the equivalent impedance of the power line TL is, the charge control chip 130 takes the equivalent impedance of the power line TL into consideration and sets the work load which is matched with the rated output power of the power adaptor 10. Thus, when the power adaptor 10 is used to provide power to the portable electronic device 100, it does not need to worry about the problem of match between the power adaptor 10 and the portable electronic device 100.

Figure 3:
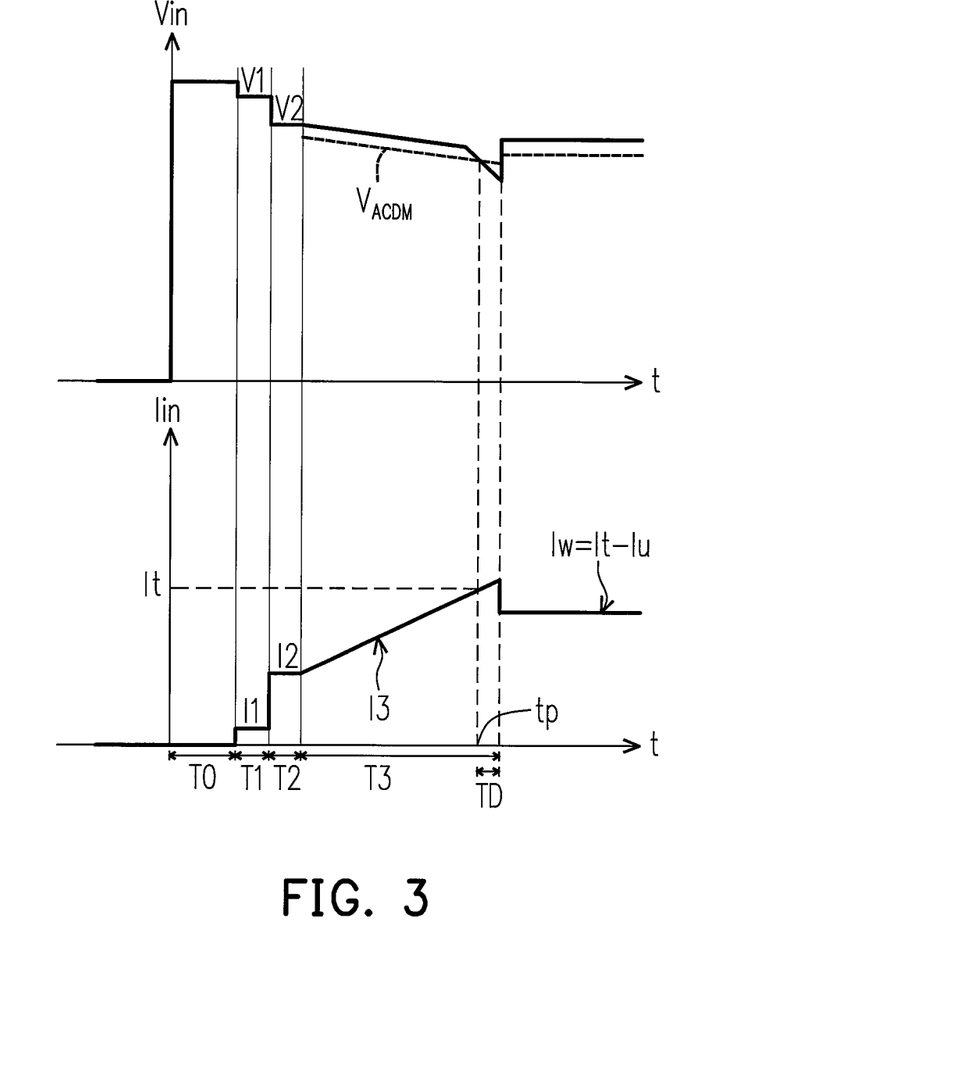
FIG. 3 is a sequence diagram showing a charging process of a portable electronic device in an embodiment.
Figure 6:
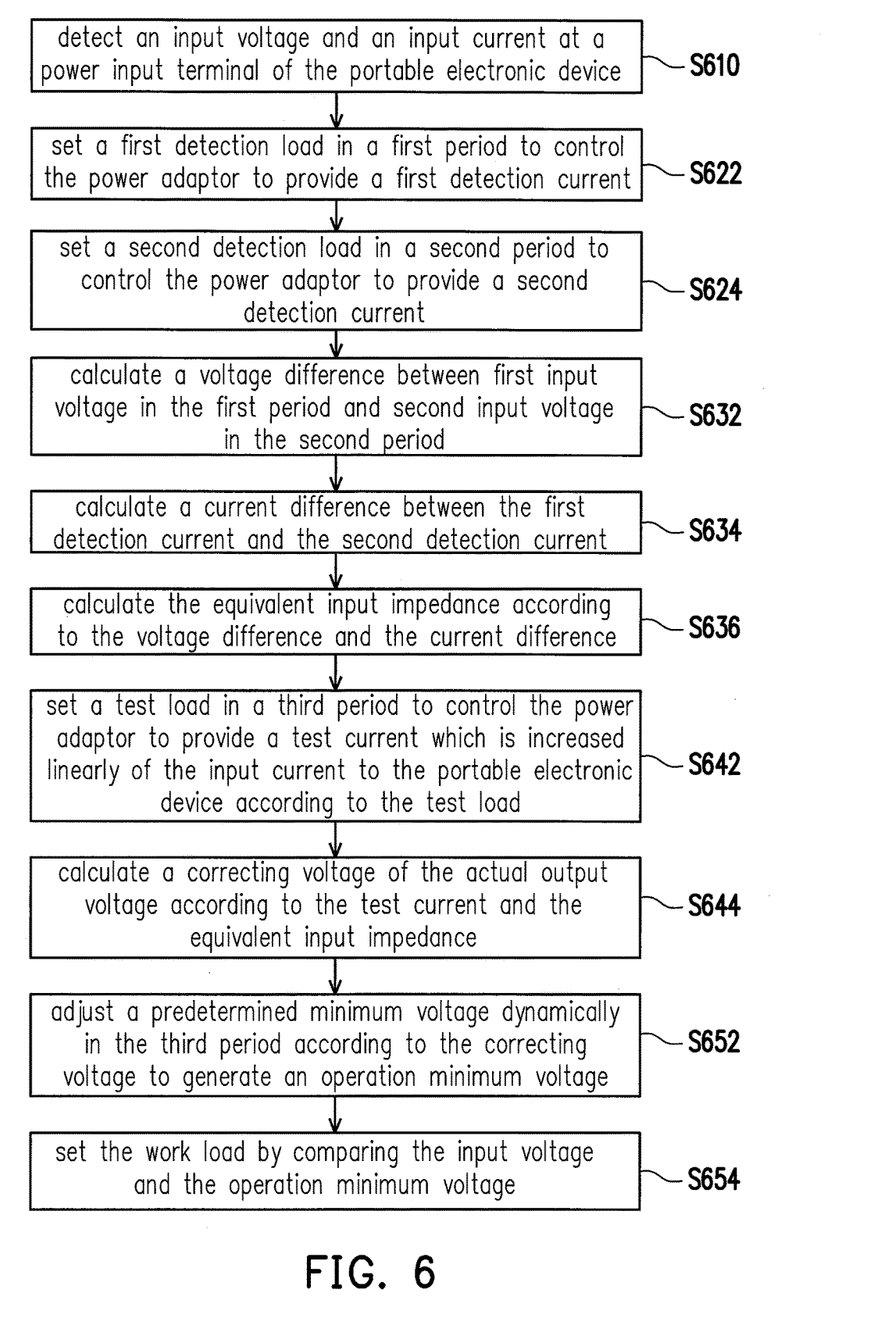
FIG. 6 is a flow chart showing a power supply control method of a portable electronic device in an embodiment.
Figure 7:
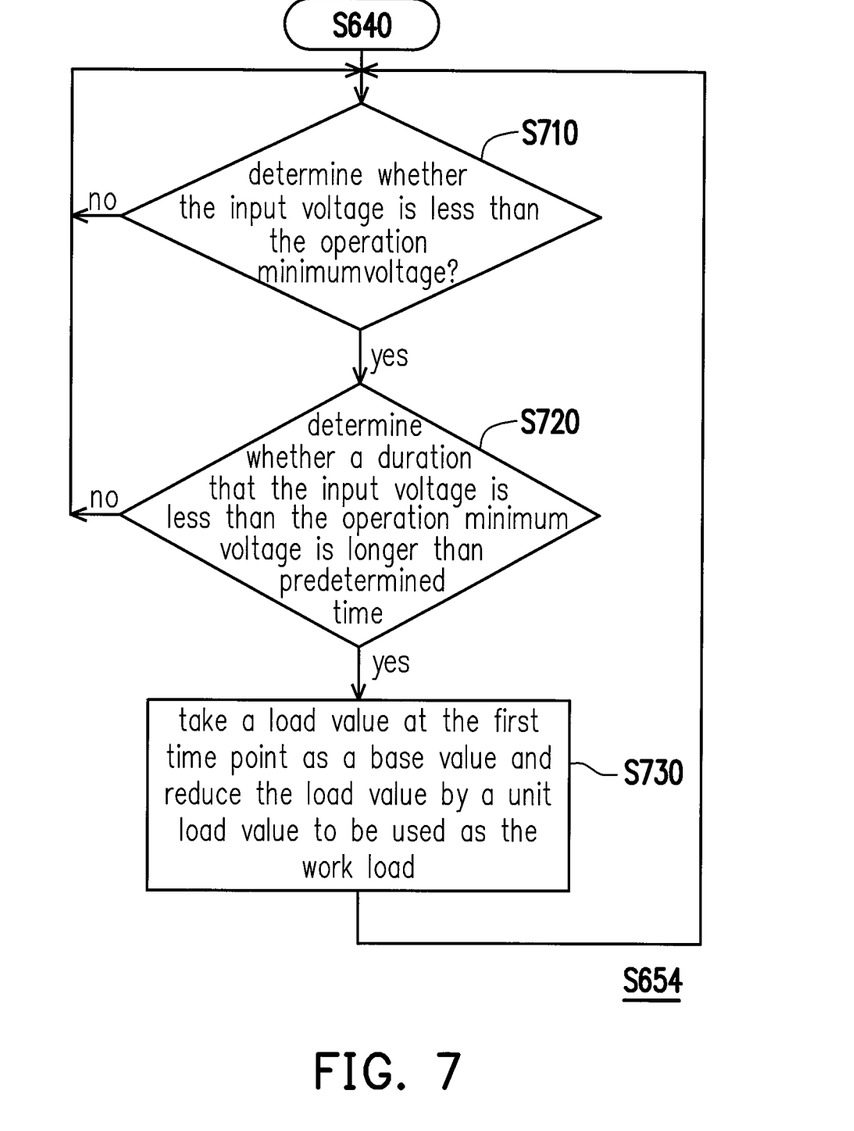
FIG. 7 is a flow chart showing the step of setting a work load of the embodiment in FIG. 6.

The power supply control method is further illustrated with FIG. 3, FIG. 6, FIG. 7 and FIG. 1. FIG. 3 is a sequence diagram showing a charging process of the portable electronic device in an embodiment. FIG. 6 is a flow chart showing a power supply control method of a portable electronic device in an embodiment, and FIG. 7 is a flow chart showing the step of setting a work load of the embodiment in FIG. 6.

Please refer to FIG. 3 and FIG. 6, in the power supply control method of the embodiment, the charge control chip 130 detects the input voltage $V_{in}$ and the input current $I_{in}$ at the power input terminal PIN_I (step S610). When the charge control chip 130 determines the power adaptor 10 is connected to the portable electronic device 100 via the power input terminal PIN_I, the charge control chip 130 sets no load in a period $T_0$ (such as 200 ms). Thus, in the period $T_0$, the power adaptor 10 does not generate the output current $I_{AD}$ (which means the charge control chip 130 does not extract current from the power adaptor 10), and waits until the power adaptor 10 operates stably.

When the period $T_0$ is over and the period $T_1$ starts, the charge control chip 130 sets the load to a first detection load at the start point of the period $T_1$, so as to control the power adaptor 10 to provide the current $I_1$ (which is the detection current, such as 100 mA) as the input current $I_{in}$ (step S622). The charge control chip 130 detects the input voltage $V_{in}$ at the power input terminal PIN_I and records it as the voltage $V_1$.

When the period $T_2$ starts, the charge control chip 130 sets the load to the second detection load at the start point of the period $T_2$, so as to control the power adaptor 10 to provide the current $I_2$ (which is the detection current, such as 500 mA) as the input current $I_{in}$ (step S624). The charge control chip 130 detects the input voltage $V_{in}$ at the power input terminal PIN_I and records it as the voltage $V_2$. In an embodiment, the voltage $V_1$ and the voltage $V_2$ are an average voltage value in the period $T_1$ and the period $T_2$, respectively, which is not limited herein.

After the voltage $V_1$, the voltage $V_2$ and the current $I_1$, the current $I_2$ are detected, the charge control chip 130 calculates a voltage difference ($V_1-V_2$) according to the voltage $V_1$ and the voltage $V_2$ (step S632) and calculates a current difference ($I_2-I_1$) according to the current $I_1$ and the current $I_2$ (step S634). Then, the charge control chip 130 calculates the equivalent input impedance $R_{in}$ according to the voltage difference and the current difference (step S636). The equivalent input impedance $R_{in}$ is represented by ($V_1-V_2$)/($I_2-I_1$). The equivalent input impedance $R_{in}$ represents a sum of the impedance between the power adaptor 10 and the charge control chip 130, and the equivalent input impedance includes the impedance of the transmission lines, the impedance of the circuit board and other impedances.

When the period $T_3$ starts, the charge control chip 130 sets the load to be a test load which is increased linearly at the start point of the period $T_3$, so as to control the power adaptor 10 to provide the test current $I_3$ which is increased linearly to be used as the input current $I_{in}$ according to the test load (step S642). A slope of the straight line of the test current $I_3$ is defined according to requirements. In an embodiment, the slope of the straight line of the test current $I_3$ is 1 A/s (which means the test current increases 100 mA every 100 ms), which is not limited herein.

In the period $T_3$, the charge control chip 130 records the value of the test current $I_3$ instantly, and calculates a correcting voltage (represented by $V_{adj}$) relative to the actual output voltage $V_{AD}$ of the power adaptor 10 according to the test current $I_3$ and the equivalent input impedance $R_{in}$ (step S644). The correcting voltage $V_{adj}$ is represented by $V_{adj}=I_3 \times R_{in}$, and the actual output voltage $V_{AD}$ is represented by $V_{AD}=V_{in}+V_{adj}$.

In detail, when the portable electronic device 100 increases the load linearly, the actual output voltage $V_{AD}$ of the power adaptor 10 decreases until the output current $I_{AD}$ exceeds the rated current value. When the output current $I_{AD}$ exceeds the rated current value, the actual output voltage $V_{AD}$ decreases rapidly. That means, the power adaptor 10 overloads. Therefore, in the power supply control method, by detecting whether the actual output voltage $V_{AD}$ of the power adaptor 10 is less than a predetermined minimum voltage (which is defined by users and represented by $V_L$), the output current $I_{AD}$ of the power adaptor 10 exceeds the rated current value is determined. In the embodiment, the actual output voltage $V_{AD}$ is taken as a determining reference voltage of the overload protection, the equivalent input impedance $R_{in}$ can be taken into consideration, and the overload determining accuracy is improved.

Since the voltage and the current detected by the charge control chip 130 are the input voltage $V_{in}$ and the input current $I_{in}$ at the power input terminal PIN_I, the charge control chip 130 calculates the actual output voltage $V_{AD}$ of the power adaptor 10 by correcting the predetermined minimum voltage $V_L$ according to the correcting voltage $V_{adj}$.

Figure 5:
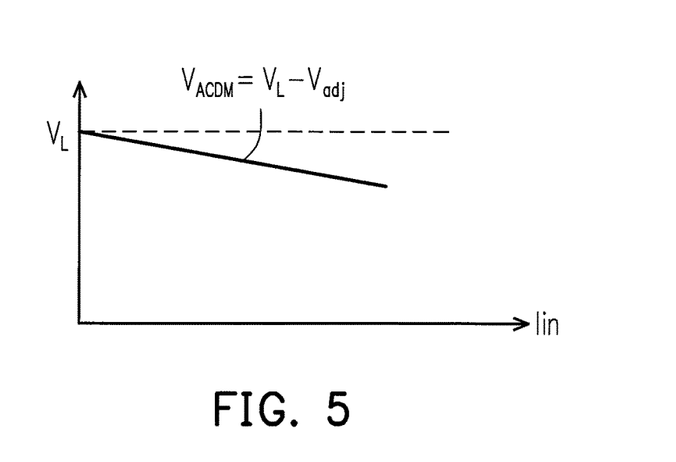
FIG. 5 is a schematic diagram showing a relation between an minimum operation voltage and an input current in an embodiment.

In detail, in the embodiment, the charge control chip 130 dynamically adjusts the predetermined minimum voltage $V_L$ according to the correcting voltage $V_{adj}$ to generate the minimum operation voltage $V_{ACDM}$ (step S652). The minimum operation voltage $V_{ACDM}$ reflects the actual output voltage $V_{AD}$ of the power adaptor 10, and the value of the minimum operation voltage $V_{ACDM}$ changes with the input current $I_{in}$. The minimum operation voltage $V_{ACDM}$ is represented by $V_{ACDM}=V_L-V_{adj}$. A relation between the minimum operation voltage $V_{ACDM}$ and the input current $I_{in}$ is shown in FIG. 5. Please refer to FIG. 5, the minimum operation voltage $V_{ACDM}$ decreases along with the increase of the input current $I_{in}$, and the decreasing slope is determined by the equivalent input impedance $R_{in}$.

Please refer to FIG. 3 and FIG. 6, in the period $T_3$, the charge control chip 130 compares the detected an input voltage $V_{in}$ and the minimum operation voltage $V_{ACDM}$ to set the work load according to the compare result, and the input current $I_{in}$ is determined by adjusting the work load (step S654).

Details of the step S650 are shown in FIG. 7. Please refer to FIG. 3 and FIG. 7, after the step 5640 is executed, the charge control chip 130 determines whether the input voltage $V_{in}$ is less than the minimum operation voltage $V_{ACDM}$ (step S710). When the input voltage $V_{in}$ at the time point $t_p$ is less than the minimum operation voltage $V_{ACDM}$, the charge control chip 130 determines whether the duration that the input voltage $V_{in}$ is less than the minimum operation voltage $V_{ACDM}$ is longer than the predetermined time $T_D$ (step S720). When the determining results in the step S710 and the step S720 are yes, the charge control chip 130 takes the load value at the time point $t_p$ as a base value to reduce a unit load value which is regarded as the work load (step S730).

In detail, as shown in FIG. 3, when the charge control chip 130 determines the input voltage $V_{in}$ at the time point $t_p$ is less than the minimum operation voltage $V_{ACDM}$, it means that the value It of the test current $I_3$ (such as 1 A) approaches or exceeds the rated current value of the power adaptor 10. In order to avoid a misjudgment due to the perturbation of the input voltage $V_{in}$ because of the power supply noise or a slow response of the circuit, the charge control chip 130 continues detecting for a predetermined period $T_D$, and when it is confirmed that the input voltage $V_{in}$ maintains less than the minimum operation voltage $V_{ACDM}$ during the period $T_D$, the charge control chip 130 determines the test current $I_3$ outputted by the power adaptor 10 exceeds the rated current value. Then, the load value at the time point $t_p$ (which corresponds to the current value $I_t$) is taken as a base value, and the base value is reduced by a unit load value (which corresponds to the current value $I_u$, such as 100 mA) to be used as the work load. In other words, under the set work load, the charge control chip 130 extracts the work current $I_w$ from the power adaptor, and the work current $I_w$ is represented by $I_w=I_t-I_u$.

In an embodiment, the rated output power of the power adaptor is 5V/1 A, and the predetermined minimum voltage $V_L$ is 4.5V. When the equivalent input impedance $R_{in}$ calculated by the charge control chip 130 is 0.1 Ω after the previous steps are executed, when the charge control chip 130 detects that the input current $I_{in}$ increases to 1 A, the minimum operation voltage $V_{ACDM}$ is 4.5(V)−0.1(Ohm)×1 (A)=4.4(V). At the time, since the actual output current $I_{AD}$ of the power adaptor 10 does not exceed the rated current value (1 A), the input voltage $V_{in}$ continuously decreases but not less than the minimum operation voltage $V_{ACDM}$. When the load continuously becomes heavier, since the output current $I_{AD}$ of the power adaptor 10 exceeds the rated current value 1 A, the input voltage $V_{in}$ detected by the charge control chip 130 decreases to 4.4V rapidly. When the duration that the input voltage $V_{in}$ is less than 4.4V is longer than the predetermined time (such as 20 ms), the charge control chip 130 reduces the load value at the time point $t_p$ (which corresponds to the extracted current 1 A) by a unit load value (which corresponds to the extracted current 100 mA) to be used as the work load. Consequently, the work current $I_w$ maintains at 900 mA which is slightly lower than the rated current value 1 A, and the power adaptor 10 operates stably and efficiently.

In an embodiment, the rated output power of the power adaptor is 5V/2 A and the predetermined minimum voltage $V_L$ is 4.5V. When the equivalent input impedance $R_{in}$ calculated by the charge control chip 130 is 0.1 Ω after the previous steps are executed, when the charge control chip 130 detects that the input current $I_{in}$ increases to 2 A, the minimum operation voltage $V_{ACDM}$ is 4.5(V)–0.1(Ohm)×2 (A)=4.3(V). At the time, since the actual output current $I_{AD}$ of the power adaptor 10 does not exceed the rated current value (2 A), the input voltage $V_{in}$ continuously decreases but not less than the minimum operation voltage $V_{ACDM}$. When the load continuously becomes heavier, since the output current $I_{AD}$ of the power adaptor 10 exceeds the rated current value 2 A, the input voltage $V_{in}$ detected by the charge control chip 130 decreases to 4.3V rapidly. When the duration that the input voltage $V_{in}$ less than 4.3V is longer than the predetermined time (such as 20 ms), the charge control chip 130 reduces the load value at the time point $t_p$ (which corresponds to the extracted current 2 A) by a unit load value (which corresponds to the extracted current 100 mA) to be used as the work load. Consequently, the work current $I_w$ maintains at 1.9 A which is slightly lower than the rated current value 2 A.

As stated above, no matter how much the rated output power of the power adaptor 10 is, in the power supply control method, the work load is set to approach the rated output power of the power adaptor 10 by calculating the minimum operation voltage $V_{ACDM}$ which changes along with the input current $I_{in}$, and thus the power adaptor 10 has high power efficiently.

In an embodiment, it is also considered that the rated output power decreases due to the overheating and burn-in of the power adaptor 10. In the embodiment, after the work load $I_w$ is set by the charge control chip 130, the charge control chip 130 continuously detects whether the input voltage $V_{in}$ is less than the minimum operation voltage $V_{ACDM}$ again. When the charge control chip 130 determines the duration that the input voltage $V_{in}$ is less than the minimum operation voltage $V_{ACDM}$ is longer than the predetermined period $T_D$, the charge control chip 130 reduces the work load by a unit load value to avoid an overload of the power adaptor 10. Please refer to FIG. 4, FIG. 4 is a sequence diagram showing a charging process of a portable electronic device in an embodiment.

Figure 4:
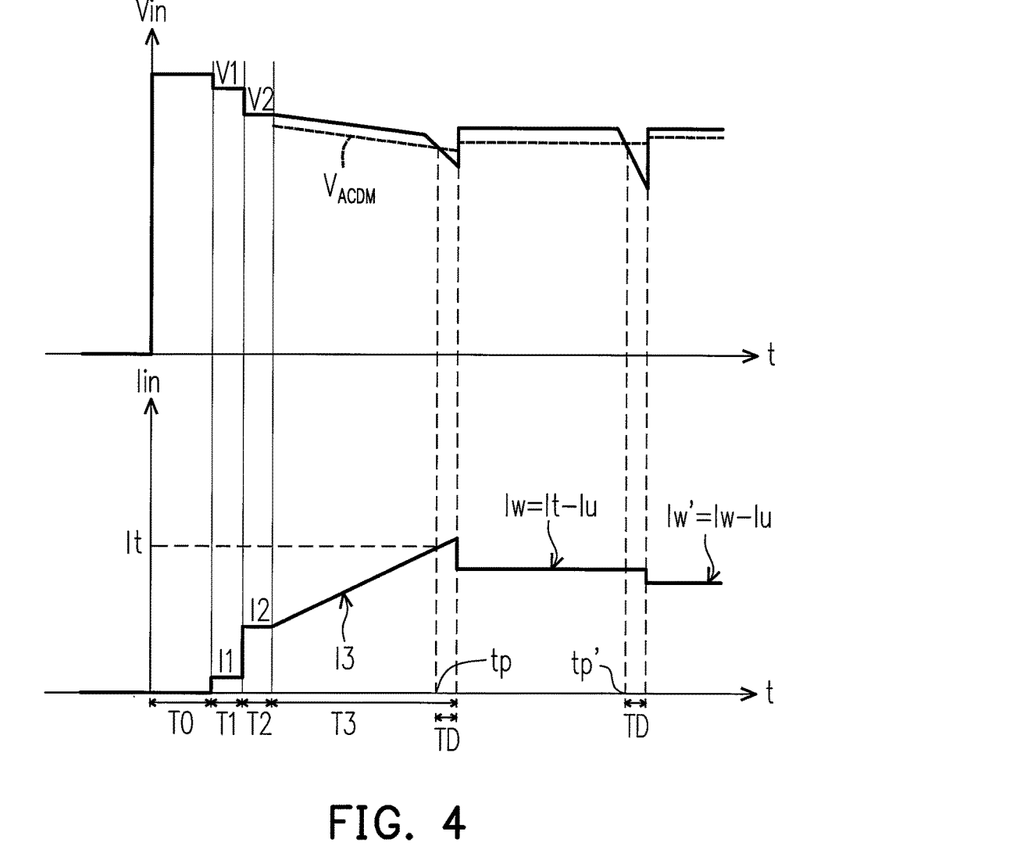
FIG. 4 is a sequence diagram showing a charging sequence of a portable electronic device in an embodiment.

Please refer to FIG. 4 and FIG. 7, the time sequence before the time point $t_p'$ is the same as the embodiment in FIG. 3, which is omitted herein. In the embodiment, the work load is set corresponding to the work current $I_w$ which is 900 mA extracted from the power adaptor 10. However, the power adaptor 10 overloads due to overheating and burn-in of the power adaptor 10. At the moment, the charge control chip 130 detects that the input voltage $V_{in}$ at the time point $t_p'$ is less than the minimum operation voltage $V_{ACDM}$ again (step S710), and the charge control chip 130 detects that the duration that the input voltage $V_{in}$ is less than the minimum operation voltage $V_{ACDM}$ is longer than the predetermined time $T_D$ (step S720). Consequently, the charge control chip 130 takes the set load value (which corresponds to the extracted current 900 mA) as a base value and further reduces the load value by a unit load value (which corresponds to the extracted current 100 mA) set as the work load (step S730). Thus, the work current $I_w'$ decreases from 900 mA to 800 mA. At the time, when the input voltage $V_{in}$ restores to be greater than the minimum operation voltage $V_{ACDM}$, the charge control chip 130 keeps extracting current from the power adaptor 10 with the current work load (step S710). When the input voltage $V_{in}$ is still less than the minimum operation voltage $V_{ACDM}$, the charge control chip 130 repeats executing the previous steps until the input voltage $V_{in}$ is greater than the minimum operation voltage $V_{ACDM}$.

In another embodiment, the load value is reduced in multiple sub stages. In detail, different predetermined minimum voltages $V_L$ are set, and the charge control chip 130 calculates the corresponding minimum operation voltages $V_{ACDM}$, respectively, and then the load values are adjusted in sub stages accordingly.

In an embodiment, when the predetermined minimum voltage is 4.5V and the input voltage $V_{in}$ is less than the minimum operation voltage $V_{ACDM}$, the charge control chip 130 directly reduces the output current $I_{AD}$ of the power adaptor 10 by 100 mA. In the embodiment, the predetermined minimum voltage $V_L$ includes a first voltage lower limit (4.75V) and a second voltage lower limit (4.5V). When the input voltage $V_{in}$ is less than the first voltage lower limit but greater than the second voltage lower limit, the charge control chip 130 reduces the output current $I_{AD}$ of the power adaptor 10 by 50 mA. When the input voltage $V_{in}$ continuously decreases and becomes less than the second voltage lower limit, the charge control chip 130 further reduces the output current $I_{AD}$ by 100 mA at the overload time point. Therefore, the security of the power adaptor 10 is improved.

In sum, the power supply control method of the portable electronic device and the portable electronic device using the same are provided, the actual output voltage of the power adaptor is calculated by detecting the input voltage and the input current, and the rated output power of the power adaptor is determined according to the change of the actual output voltage of the power adaptor and the feature of the output current. Then, the work load is dynamically set to ensure the security of the power adaptor accordingly, and the portable electronic device is charged with a power close to the rated output power. Thus, the power supply efficiency of the power adaptor is improved without the problem of matching between the power adaptor and the portable electronic device, which improves the convenience in using.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A power supply control method, adapted to control current drawn from a power adaptor by a portable electronic device, the power supply control method comprising following steps:
   detecting an input voltage and an input current at a power input terminal of the portable electronic device;
   setting a plurality of detection loads sequentially to control the power adaptor to provide a detection current as the input current to the portable electronic device according to the detection loads, respectively;
   calculating an equivalent input impedance of the power input terminal according to the detection current and the input voltage respectively;

calculating an actual output voltage of the power adaptor according to the equivalent input impedance, the input voltage and the input current; and setting a work load according to the actual output voltage to control the power adaptor to provide a work current as the input current to the portable electronic device according to the work load.

2. The power supply control method of the portable electronic device according to claim 1, wherein the step of setting the detection loads to control the power adaptor to provide the detection current as the input current to the portable electronic device according to the detection loads includes:

setting a first detection load in a first period to control the power adaptor to provide a first detection current; and setting a second detection load in a second period to control the power adaptor to provide a second detection current.

3. The power supply control method of the portable electronic device according to claim 2, wherein the step of calculating the equivalent input impedance of the power input terminal according to the detection current and the input voltages, respectively, further includes:

calculating a voltage difference between a first input voltage in the first period and a second input voltage in the second period;

calculating a current difference between the first detection current and the second detection current; and calculating the equivalent input impedance according to the voltage difference and the current difference.

4. The power supply control method according to claim 1, wherein the step of calculating the actual output voltage of the power adaptor according to the equivalent input impedance, the input voltage and the input current further includes:

setting a test load in a third period to control the power adaptor to provide a test current which is increased linearly as the input current to the portable electronic device according to the test load; and calculating a correcting voltage of the actual output voltage according to the test current and the equivalent input impedance.

5. The power supply control method according to claim 4, wherein the step of setting the work load according to the actual output voltage to control the power adaptor to provide the work current as the input current to the portable electronic device according to the work load includes:

adjusting a predetermined minimum voltage dynamically in the third period according to the correcting voltage to generate an minimum operation voltage; and setting the work load by comparing the input voltage and the minimum operation voltage.

6. The power supply control method according to claim 5, wherein the step of setting the work load by comparing the input voltage and the minimum operation voltage includes:

determining whether the input voltage is less than the minimum operation voltage;

determining whether a duration that the input voltage is less than the minimum operation voltage is longer than predetermined time when the input voltage at a first time point is less than the minimum operation voltage; and taking a load value at the first time point as a base value and reducing the load value by a unit load value to be used as the work load when the duration is longer than the predetermined time.

7. A portable electronic device, comprising:
a power input terminal;
a function module;
a battery module; and
a charge control chip coupled to the function module and the battery module, wherein when a power adaptor is connected to the power input terminal, the charge control chip receives power from the power adaptor via the power input terminal, and the charge control chip provides the power to the function module and the battery module, wherein the charge control chip detects an input voltage and an input current at the power input terminal, sets a plurality of detection loads sequentially to control the power adaptor to provide a detection current as the input current according to the detection loads, respectively, and calculates an equivalent input impedance of the power input terminal according to the detection current and the input voltage respectively, the charge control chip calculates an actual output voltage of the power adaptor according to the equivalent input impedance, the input voltage and the input current, and sets a work load according to the actual output voltage to control the power adaptor to provide a work current as the input current according to the work load.

8. The portable electronic device according to claim 7, wherein the charge control chip sets a first detection load in a first period to control the power adaptor to provide a first detection current, the charge control chip sets a second detection load in a second period to control the power adaptor to provide a second detection current, the charge control chip calculates a voltage difference between a first input voltage in the first period and a second input voltage in the second period, calculates a current difference A portable electronic device, comprising: between the first detection current and the second detection current, and calculates the equivalent input impedance according to the voltage difference and the current difference.

9. The portable electronic device according to claim 7, wherein the charge control chip sets a test load in a third period to control the power adaptor to provide a test current which is increased linearly as the input current according to the test load, calculates a correcting voltage of the actual output voltage according to the test current and the equivalent input impedance, and adjusts a predetermined minimum voltage dynamically in the third period according to the correcting voltage to generate an minimum operation voltage, and the charge control chip compares the input voltage and the minimum operation voltage to set the work load according to a compare result.

10. The portable electronic device according to claim 9, wherein the charge control chip determines whether the input voltage is less than the minimum operation voltage and determines whether a duration that the input voltage is less than the minimum operation voltage is longer than predetermined time, and when the duration that the input voltage at a first time point is less than the minimum operation voltage is longer than the predetermined time, the charge control chip takes a load value at the first time point as a base value and reduces the load value by a unit load value to be used as the work load.

* * * * *